(12) United States Patent
Matthews et al.

(10) Patent No.: US 6,968,824 B1
(45) Date of Patent: Nov. 29, 2005

(54) DETERMINING MANIFOLD PRESSURE BASED ON ENGINE TORQUE CONTROL

(75) Inventors: Gregory P. Matthews, West Bloomfield, MI (US); Michael Livshiz, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 10/868,192

(22) Filed: Jun. 15, 2004

(51) Int. Cl.[7] ............................................. F02D 9/08
(52) U.S. Cl. .................... 123/350; 123/399; 73/118.2
(58) Field of Search ............................ 123/350, 399; 73/118.2

(56) References Cited

U.S. PATENT DOCUMENTS

| | | | |
|---|---|---|---|
| 545,617 A | 9/1895 | Tynes | |
| 5,423,208 A | 6/1995 | Dudek et al. | |
| 6,636,796 B2 * | 10/2003 | Kolmanovsky et al. | 701/104 |
| 6,655,201 B2 * | 12/2003 | Masson et al. | 73/118.2 |

* cited by examiner

Primary Examiner—Hai Huynh
(74) Attorney, Agent, or Firm—Christopher DeVries

(57) ABSTRACT

A torque control system for an engine includes a throttle plate having an adjustable throttle position to regulate a first mass air flow into the engine. A control module estimates a previous volumetric efficiency of the engine based on a previous manifold absolute pressure (MAP) and determines a current MAP based on the previous volumetric efficiency. The control module calculates a difference between the current MAP and the previous MAP and sets a desired MAP equal to the present MAP when the difference is less than a threshold difference. The control module commands the throttle position based on the desired MAP.

32 Claims, 4 Drawing Sheets

US 6,968,824 B1

DETERMINING MANIFOLD PRESSURE BASED ON ENGINE TORQUE CONTROL

CROSS-REFERENCE TO RELATED APPLICATIONS

This application is related to U.S. application Ser. No. 10/868,205, filed Jun. 15, 2004, entitled, "Determining Manifold Pressure Based on Engine Torque Control" (GM Ref: GP-305270). The disclosure of the above application is incorporated herein by reference.

FIELD OF THE INVENTION

The present invention relates to engine torque control, and more particularly to determining manifold pressure based on engine torque control.

BACKGROUND OF THE INVENTION

Internal combustion engine control systems have been developed as steady-state, torque-based control systems. In a torque-based control system, the desired torque output of the engine is indicated by a driver input. More specifically, a driver adjusts a position of an accelerator pedal, which provides an engine torque request. The throttle is controlled to regulate air flow into the engine that provides the desired engine torque output.

Torque-based control systems determine the mass of air needed to produce the desired engine torque and determine throttle position, exhaust gas recirculation (EGR) valve position and cam phase angles based on the mass of air. Traditionally, the throttle position is commanded directly as a function of the accelerator pedal position. Commonly assigned U.S. patent application Ser. No. 10/664,172, filed on Sep. 17, 2003 and entitled Engine Torque Control with Desired State Estimation describes a method which uses the manifold filling dynamics and can initially command the throttle to a value greater than the steady-state value. As the manifold fills with air the, throttle is brought back to the steady-state position. This results in an a more aggressive partial throttle acceleration, but may lead to an unexpected feel of the vehicle to the driver by not producing the expected behavior of the throttle to a step-in change in the accelerator pedal.

SUMMARY OF THE INVENTION

Accordingly, the present invention provides a torque control system for an engine. The torque control system includes a throttle plate having an adjustable throttle position to regulate a first mass air flow into the engine. A control module estimates a previous volumetric efficiency of the engine based on a previous manifold absolute pressure (MAP) and determines a current MAP based on the previous volumetric efficiency. The control module calculates a difference between the current MAP and the previous MAP and sets a desired MAP equal to the present MAP when the difference is less than a threshold difference. The control module commands the throttle position based on the desired MAP.

In other features, the control module updates the previous volumetric efficiency and the current MAP for a subsequent time step. The control module performs the updating when the difference exceeds the threshold difference. The control module sets the desired MAP equal to the present MAP when the updating has occurred a threshold number of times.

In another feature, the previous volumetric efficiency is further based on an engine speed.

In another feature, the previous volumetric efficiency is further based on a phase angle of an inlet cam shaft.

In another feature, the previous volumetric efficiency is further based on a phase angle of an outlet cam shaft.

In still other features, the torque control system further includes an accelerator. An engine torque request is determined based on a position of the accelerator. The control module determines a first mass of air flowing through a throttle based on the engine torque request. The current MAP is further based on the first mass of air flowing through a throttle. The current MAP is further based on a temperature of the first mass of air. The current MAP is further determined based on a second mass of air flowing through an exhaust gas recirculation (EGR) valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
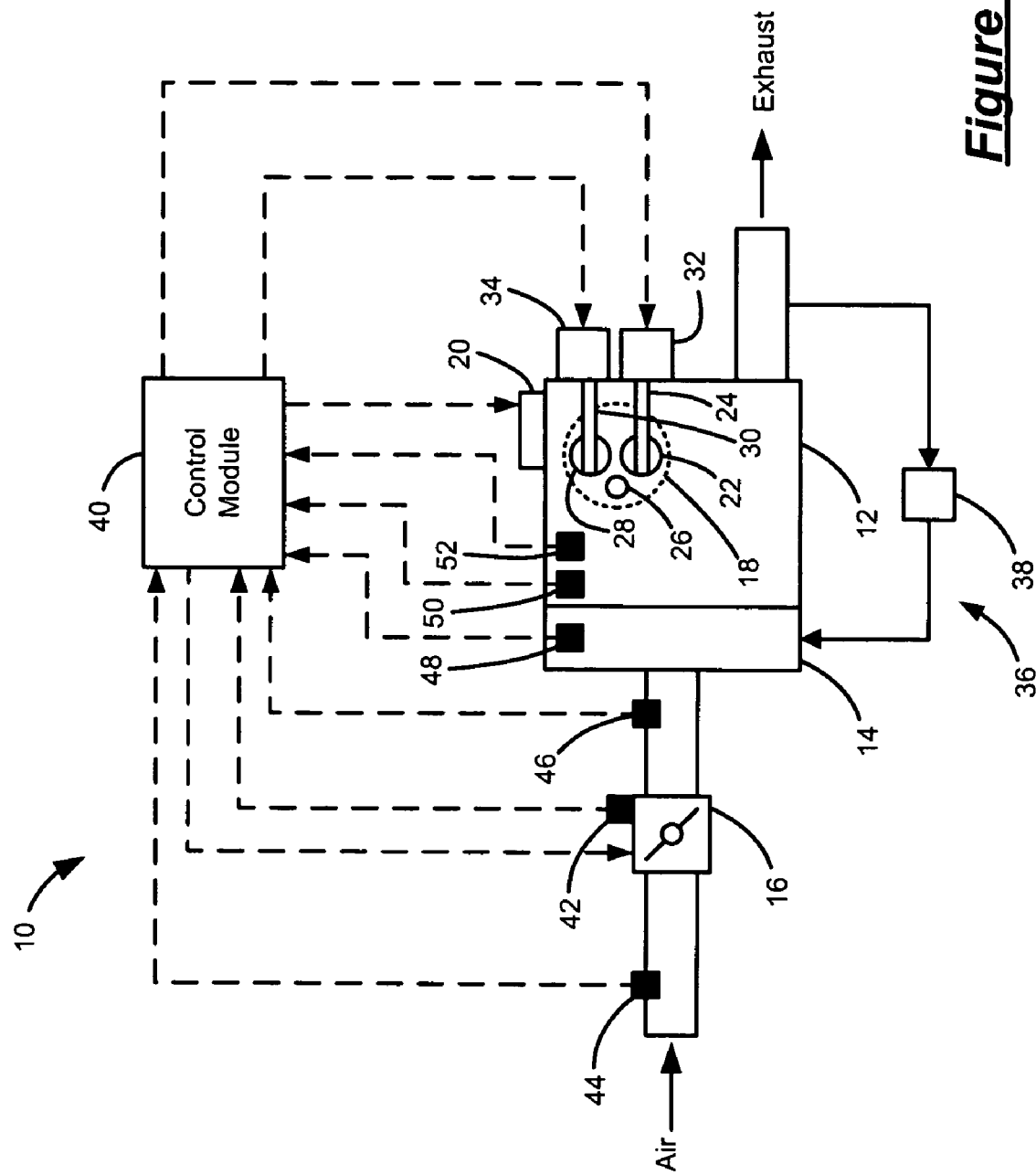
FIG. 1 is a schematic illustration of an exemplary engine system that is operated based on the engine torque control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it is appreciated that the engine torque control system of the present invention can be implemented in engines having a plurality of cylinders including, but not limited to, 2, 3, 4, 5, 6, 8, 10 and 12 cylinders.

A fuel injector (not shown) injects fuel which is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it is appreciated that the engine 12 can include multiple intake and exhaust valves 22,28 per cylinder 18.

The engine system 10 can include an intake cam phaser 32 and an exhaust cam phaser 34 that respectively regulate the rotational timing of the intake and exhaust cam shafts 24,30. More specifically, the timing or phase angle of the respective intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 can also include an exhaust gas recirculation (EGR) system 36. The EGR system 36 includes an EGR valve 38 that regulates an exhaust flow back into the intake manifold 14. The EGR system is generally implemented to regulate emissions. However, the mass of exhaust air that is recirculated back into the intake manifold 14 affects engine torque output.

A control module 40 operates the engine based on the engine torque control of the present invention. More specifically, the control module 40 generates a throttle control signal based on an engine torque request ($T_{REQ}$) and a throttle position signal generated by a throttle position sensor (TPS) 42. $T_{REQ}$ is generated based on a driver input such as an accelerator pedal position. The control module commands the throttle to a steady-state position to achieve an effective throttle area ($A_{eff}$) A throttle actuator (not shown) adjusts the throttle position based on the throttle control signal. The throttle actuator can include a motor or a stepper motor, which provides limited and/or coarse control of the throttle position. The control module 40 also regulates the fuel injection system 20, the cam shaft phasers 32,34 and the EGR system 36 to achieve $T_{REQ}$.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed of the engine 12 and generates in an engine speed signal. Each of the signals generated by the sensors are received by the control module 40.

The engine torque control system of the present invention determines $A_{eff}$ based on a desired manifold absolute pressure ($P_m^*$). In one embodiment, $P_m^*$ is determined considering the throttle 16 only. In an alternative embodiment, $P_m^*$ is determined considering the throttle 16, the EGR system 36 and the cam phasers 32,34. When considering the throttle 16 only, the mass of air into the intake manifold 14 ($m_a$) can be determined using the speed density approach according to the following equation:

$$m_a = \frac{\eta_v V_d P_m}{R T_c} \tag{1}$$

where R is the universal gas constant, $V_d$ is the displacement volume of the engine 12, $\eta_v$ is the volumetric efficiency of the engine 12 and $T_c$ is the temperature of the air coming into the intake manifold 14.

Methods of determining $m_a$ are disclosed in commonly assigned U.S. patent application Ser. No. 10/664,346, filed Sep. 17, 2003 and entitled Dynamical Torque Control System, and U.S. patent application Ser. No. 10/463,166, filed Jun. 17, 2003 and entitled Model Following Torque Control, the disclosures of which are expressly incorporated herein by reference.

Because $m_a$ is known, equation (1) can be modified to calculate the desired MAP ($P_m^*$) according to the following:

$$P_m^* = \left(\frac{R}{V_d \eta_v}\right) m_a T_c \tag{2}$$

The scaled volumetric efficiency ($V_e$) of the engine 12 is provided as:

$$V_e = \frac{\eta_v V_d}{R} \tag{3}$$

Merging equation (3) into equation (2) provides:

$$P_m^* = \frac{m_a T_c}{V_e} \tag{4}$$

Although $V_e$ can be calculated from equation (3), $V_e$, is a function of $P_m$ and $N_e$, and can be estimated based on $P_m$ and $N_e$ using a look-up table. In practice, $V_e$ varies based on several factors including altitude and temperature. To account for this variance, $V_e$ is adapted according to the following relationship:

$$\hat{V}_e = \gamma V_e \tag{5}$$

where $\gamma$ is the ratio of specific heats for air.

When considering the throttle 16, the EGR system 36 and the cam phasers 32,34, $P_m^*$ is determined according to the following equation:

$$P_m^* = \frac{(m_a + m_{egr})T_c}{V_e} \quad (6)$$

where $m_{egr}$ is the mass of air recirculated by the EGR system 36 and $V_e$ is a function of $P_m$, $N_e$, $\phi_i$ and $\phi_e$. $\phi_i$, and $\phi_e$ are determined by the control module based on input from the cam phasers 32,34. Preferably, $V_e$, is estimated from a look-up table based on $P_m$, $N_e$, $\phi_i$ and $\phi_e$.

Having determined $P_m^*$ as described above, the engine torque control system determines $A_{eff}$ according to the following equation:

$$A_{eff} = \frac{\dot{m}_{th}\sqrt{RT_{amb}}}{\Phi} \quad (7)$$

where $\Phi$ is based on a pressure ratio ($P_R$) according to the following relationships:

$$\Phi = \begin{cases} \sqrt{\frac{2\gamma}{\gamma-1}\left(1 - P_R^{\frac{\gamma-1}{\gamma}}\right)} & \text{if } P_R > P_{critical} = \left(\frac{2}{\gamma+1}\right)^{\frac{\gamma}{\gamma-1}} = 0.528 \\ \sqrt{\gamma\frac{2}{\gamma+1}^{\frac{\gamma+1}{(\gamma+1)}}} & \text{if } P_R \leq P_{critical} \end{cases} \quad (8)$$

where $P_R$ is the ratio of $P_m^*$ to the ambient pressure ($P_{amb}$) and $P_{critical}$. $P_{critical}$ is defined as the pressure ratio at which the velocity of the air flowing past the throttle equals the velocity of sound. This condition is called choked or critical flow. The critical pressure ratio is determined by $$P_{CR} = \left(\frac{2}{\gamma+1}\right)^{\frac{\gamma}{\gamma-1}}$$

where $\gamma$ is the ratio of specific heats for air and range from about 1.3 to about 1.4.

The engine torque control system determines the value of $P_m^*$ to produce the desired airflow through the throttle. The airflow enables the correct amount of air to enter the cylinders to provide $T_{REQ}$ from the engine. Because the control module commands the throttle to a steady-state position, it can be assumed that $\dot{m}_{th}$ is equal to $\dot{m}_a$. More specifically, during steady-state the flow across the throttle ($\dot{m}_{th}$) is equal to the flow into the cylinders (out of the manifold) ($\dot{m}_a$). Since $A_{eff}$ and $P_m^*$ are setpoint targets and time is required to reach these values (e.g., approximately 100 ms), it can be approximated that $\dot{m}_{th}$ is equal to $\dot{m}_a$.

Figure 2:
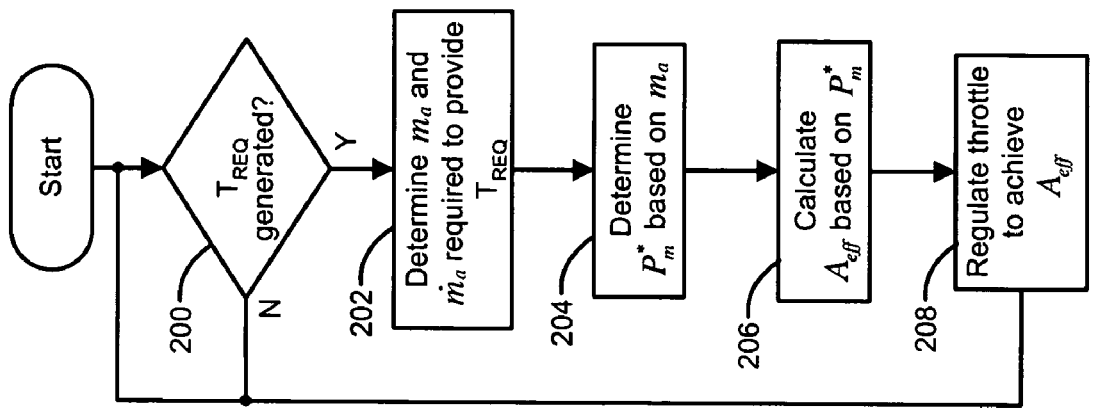
FIG. 2 is a flowchart illustrating steps performed by the engine torque control system of the present invention.

Referring now to FIG. 2, the general steps performed by the engine torque control system will be described in detail. In step 200, control determines whether $T_{REQ}$ has been generated. If $T_{REQ}$ has not been generated, control loops back. If $T_{REQ}$ has been generated, control determines $m_a$ and $\dot{m}_a$ required to achieve $T_{REQ}$ in step 202. In step 204, control determines $P_m^*$ based on $m_a$. In step 206, control determines $A_{eff}$ based on $P_m^*$. Control regulates the throttle to achieve $A_{eff}$ in step 208 and loops back to step 200.

Figure 3:
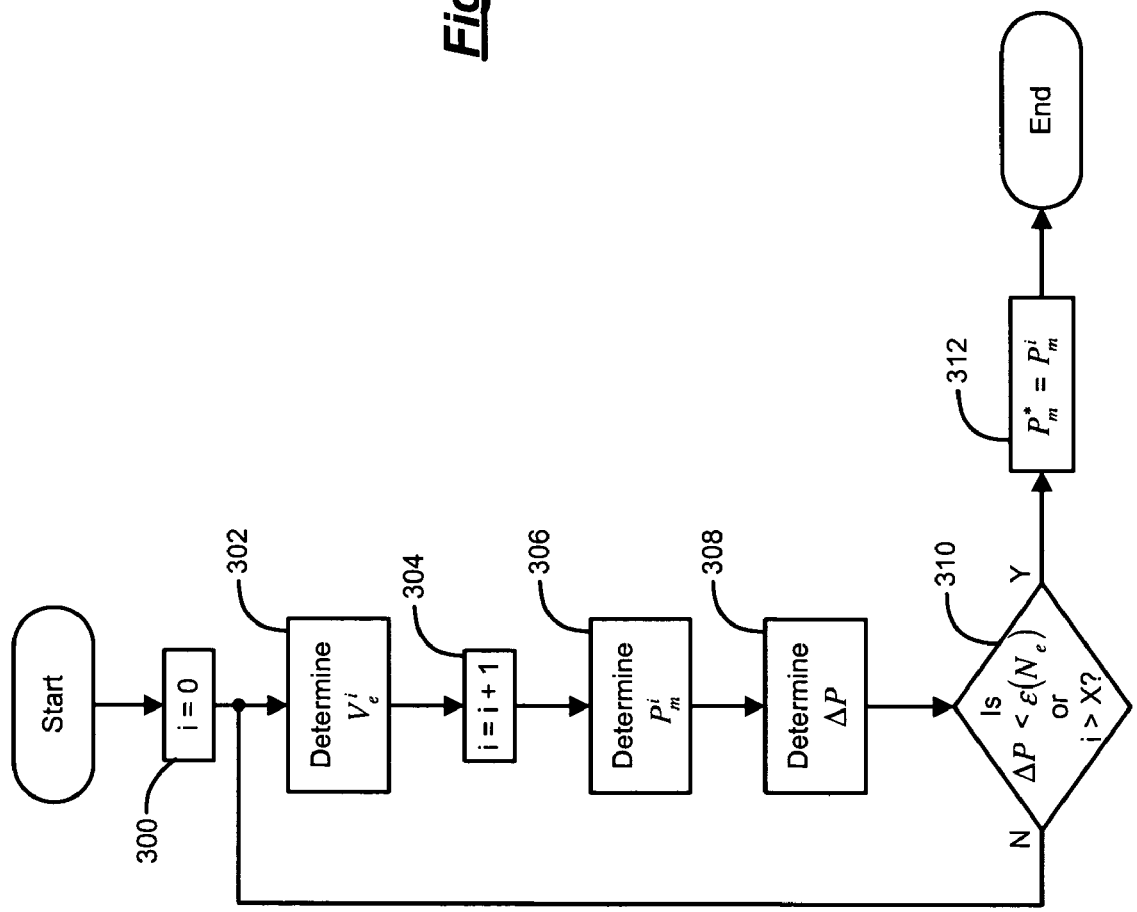
FIG. 3 is a flowchart illustrating steps for determining a desired manifold absolute pressure (MAP) based on volumetric efficiency considering a throttle of the engine system according to the present invention.

Referring now to FIG. 3, the steps for determining $P_m^*$ considering only the throttle 16 of the engine system 10 will be described in detail. In step 300, control sets an iteration counter equal to zero (i.e., i=0). In step 302, control determines $V_e^i$ based on $P_m$ and $N_e$, which are monitored by the sensors 48,52, respectively. Control increments the iteration counter by one in step 304.

In step 306, control calculates $P_m^i$ based on $V_e^i$. In step 308, control determines a pressure difference ($\Delta P$), which is the difference between $P_m^i$ and $P_m^{i-1}$. Control determines whether $\Delta P$ is below a threshold difference or whether i is greater than a threshold value (X) in step 310. The threshold difference is preferably provided as $\epsilon(N_e)$, however, it is appreciated that other threshold values can be used. Although a constant threshold difference can be used, it is more flexible to enable adjustment of the threshold difference as a function of engine speed. If either $\Delta P$ is greater than the threshold difference or i is greater than the threshold value, control continues in step 312. Otherwise, control loops back to step 302. In step 312, control sets $P_m^*$ equal to $P_m^i$ and control ends.

Figure 4:
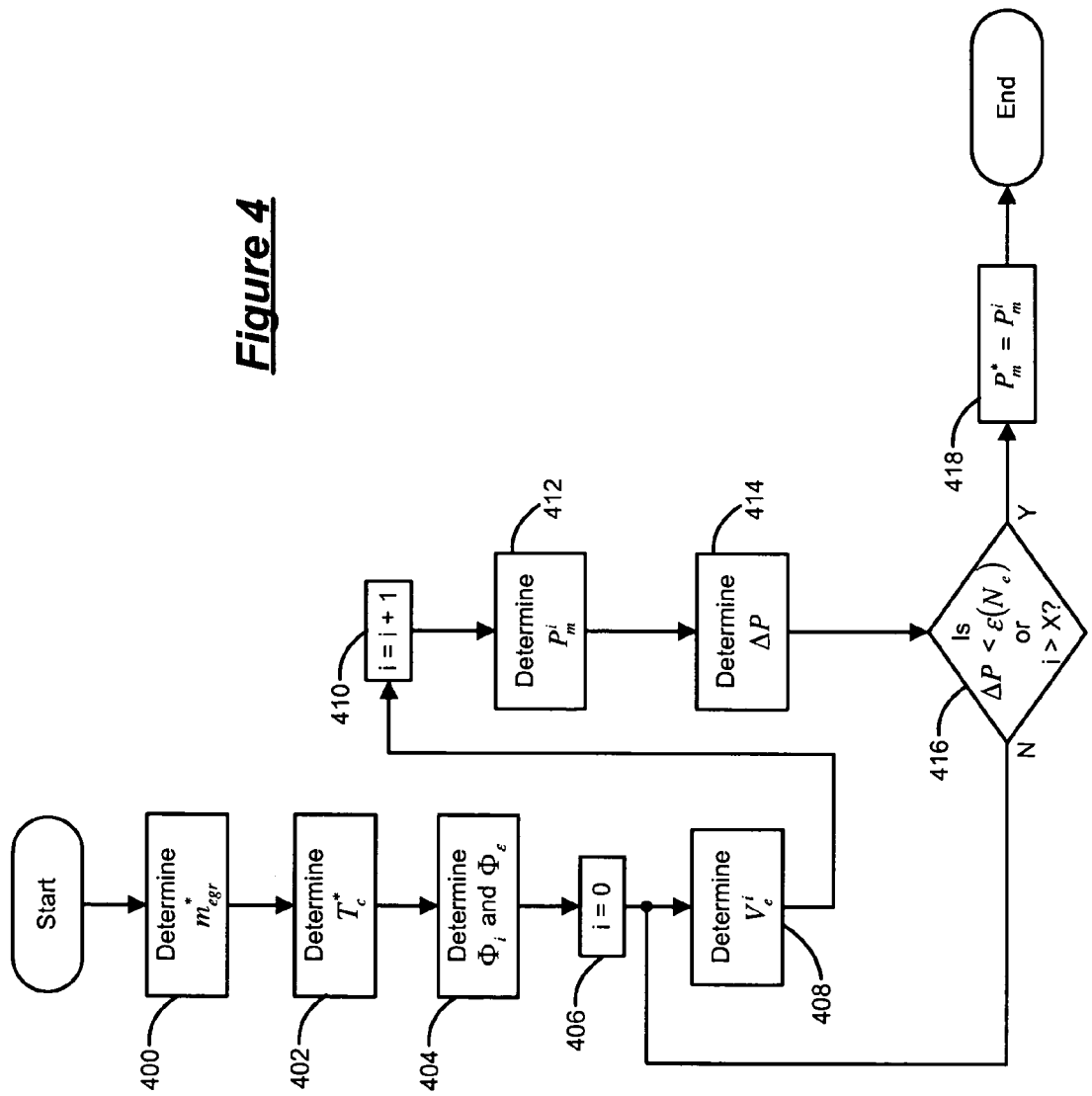
FIG. 4 is a flowchart illustrating steps for determining the desired MAP based on volumetric efficiency considering the throttle, an exhaust gas recirculation (EGR) system and an inlet cam phasing system of the engine system according to the present invention.

Referring now to FIG. 4, the steps for determining $P_m^*$ considering the throttle 16, the EGR system 36 and the cam phasers 32,34 of the engine system 10 will be described in detail. In step 400, control determines $m_{egr}$. In step 402, control determines $T_c$ and determines $\phi_i$ and $\phi_e$ in step 404. In step 406, control sets the iteration counter equal to zero (i.e., i=0). In step 408, control determines $V_e^i$ based on $P_m$ and $N_e$, which are monitored by the sensors 48,52, respectively. Control increments the iteration counter by one in step 410.

In step 412, control calculates $P_m^i$ based on $V_e^i$. In step 414, control determines a pressure difference ($\Delta P$), which is the difference between $P_m^i$ and $P_m^{i-1}$. Control determines whether $\Delta P$ is below the threshold difference or whether i is greater than the threshold value (X) in step 416. If either $\Delta P$ is greater than the threshold difference or i is greater than the threshold value, control continues in step 418. Otherwise, control loops back to step 408. In step 418, control sets $P_m^*$ equal to $P_m^i$ and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque control system for an engine, comprising:
   a throttle plate having an adjustable throttle position to regulate a first mass air flow into said engine; and
   a control module that estimates a previous volumetric efficiency of said engine based on a previous manifold absolute pressure (MAP), that determines a current MAP based on said previous volumetric efficiency, that calculates a difference between said current MAP and said previous MAP, that sets a desired MAP equal to said present MAP when said difference is less than a threshold difference and that commands said throttle position based on said desired MAP.

2. The torque control system of claim 1 wherein said control module updates said previous volumetric efficiency and said current MAP for a subsequent time step.

3. The torque control system of claim 2 wherein said control module performs said updating when said difference exceeds said threshold difference.

4. The torque control system of claim 2 wherein said control module sets said desired MAP equal to said present MAP when said updating has occurred a threshold number of times.

5. The torque control system of claim 1 wherein said previous volumetric efficiency is further based on an engine speed.

6. The torque control system of claim 1 wherein said previous volumetric efficiency is further based on a phase angle of an inlet cam shaft.

7. The torque control system of claim 1 wherein said previous volumetric efficiency is further based on a phase angle of an outlet cam shaft.

8. The torque control system of claim 1 further comprising an accelerator wherein an engine torque request is determined based on a position of said accelerator and said control module determines a first mass of air flowing through a throttle based on said engine torque request.

9. The torque control system of claim 8 wherein said current MAP is further based on said first mass of air flowing through a throttle.

10. The torque control system of claim 9 wherein said current MAP is further based on a temperature of said first mass of air.

11. The torque control system of claim 9 wherein said current MAP is further determined based on a second mass of air flowing through an exhaust gas recirculation (EGR) valve.

12. A method of determining a desired manifold absolute pressure (MAP) based on an engine torque request, comprising:
    estimating a previous volumetric efficiency based on a previous MAP;
    determining a current MAP based on said previous volumetric efficiency;
    calculating a difference between said current MAP and said previous MAP; and
    setting said desired MAP equal to said present MAP when said difference is less than a threshold difference.

13. The method of claim 12 further comprising updating said previous volumetric efficiency and said current MAP for a subsequent time step.

14. The method of claim 13 wherein said step of updating occurs when said difference exceeds said threshold difference.

15. The method of claim 13 further comprising setting said desired MAP equal to said present MAP when said step of updating has occurred a threshold number of times.

16. The method of claim 12 wherein said previous volumetric efficiency is further based on an engine speed.

17. The method of claim 12 wherein said previous volumetric efficiency is further based on a phase angle of an inlet cam shaft.

18. The method of claim 12 wherein said previous volumetric efficiency is further based on a phase angle of an outlet cam shaft.

19. The method of claim 12 wherein said current MAP is further based on a first mass of air flowing through a throttle.

20. The method of claim 19 wherein said current MAP is further based on a temperature of said first mass of air.

21. The method of claim 19 wherein said current MAP is further determined based on a second mass of air flowing through an exhaust gas recirculation (EGR) valve.

22. A method of determining a throttle position, comprising:
    estimating a previous volumetric efficiency based on a previous manifold absolute pressure (MAP);
    determining a current MAP based on said previous volumetric efficiency;
    calculating a difference between said current MAP and said previous MAP;
    setting a desired MAP equal to said present MAP when said difference is less than a threshold difference; and
    calculating said throttle position based on said desired MAP.

23. The method of claim 22 further comprising updating said previous volumetric efficiency and said current MAP for a subsequent time step.

24. The method of claim 23 wherein said step of updating occurs when said difference exceeds said threshold difference.

25. The method of claim 23 further comprising setting said desired MAP equal to said present MAP when said step of updating has occurred a threshold number of times.

26. The method of claim 22 wherein said previous volumetric efficiency is further based on an engine speed.

27. The method of claim 22 wherein said previous volumetric efficiency is further based on a phase angle of an inlet cam shaft.

28. The method of claim 22 wherein said previous volumetric efficiency is further based on a phase angle of an outlet cam shaft.

29. The method of claim 22 further comprising:
    generating an engine torque request; and
    determining a first mass of air flowing through a throttle based on said engine torque request.

30. The method of claim 29 wherein said current MAP is further based on said first mass of air flowing through a throttle.

31. The method of claim 30 wherein said current MAP is further based on a temperature of said first mass of air.

32. The method of claim 30 wherein said current MAP is further determined based on a second mass of air flowing through an exhaust gas recirculation (EGR) valve.

* * * * *